US008685568B2

(12) United States Patent
Krehl et al.

(10) Patent No.: US 8,685,568 B2
(45) Date of Patent: Apr. 1, 2014

(54) LITHIUM/FLUORINATED CARBON CELL FOR HIGH-RATE PULSATLIE APPLICATIONS

(75) Inventors: Paul Krehl, Clarence Center, NY (US); Steven Davis, Cheektowaga, NY (US); Robert Rubino, Williamsville, NY (US); Hong Gan, Williamsville, NY (US); Esther S. Takeuchi, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 778 days.

(21) Appl. No.: 11/668,500

(22) Filed: Jan. 30, 2007

(65) Prior Publication Data
US 2008/0038643 A1    Feb. 14, 2008

Related U.S. Application Data

(60) Provisional application No. 60/764,152, filed on Feb. 1, 2006.

(51) Int. Cl.
*H01M 4/13* (2010.01)
*H01M 4/82* (2006.01)

(52) U.S. Cl.
USPC ........................ 429/231.7; 29/623.1

(58) Field of Classification Search
USPC ............. 429/332, 188, 209, 231.8, 231.7, 429/231.95
See application file for complete search history.

(56) References Cited

U.S. PATENT DOCUMENTS

| 4,565,751 | A | 1/1986 | Faust et al. |
|---|---|---|---|
| 4,770,959 | A | 9/1988 | Koyama et al. |
| 4,908,198 | A | 3/1990 | Weinberg |
| 5,116,592 | A * | 5/1992 | Weinberg .................. 423/415.1 |
| 5,712,062 | A | 1/1998 | Yamana et al. |
| 6,068,921 | A | 5/2000 | Yamana et al. |
| 6,261,722 | B1 * | 7/2001 | Dasgupta et al. ............. 429/304 |
| 6,377,850 | B1 | 4/2002 | Takeuchi et al. |
| 6,596,437 | B2 | 7/2003 | Yoon et al. |
| 6,656,637 | B2 | 12/2003 | Yoon et al. |
| 6,692,871 | B2 | 2/2004 | Gan et al. |
| 6,767,670 | B2 | 7/2004 | Paulot et al. |
| 6,783,888 | B2 | 8/2004 | Gan et al. |
| 2002/0012844 | A1 * | 1/2002 | Gan et al. .................. 429/231.7 |
| 2003/0124427 | A1 | 7/2003 | Takeuchi et al. |
| 2004/0013933 | A1 * | 1/2004 | Korshunov et al. ............. 429/40 |
| 2004/0072075 | A1 | 4/2004 | Tsukamoto et al. |
| 2004/0193227 | A1 * | 9/2004 | Schmidt .......................... 607/34 |

FOREIGN PATENT DOCUMENTS

| EP | 1 150 366 A2 | 10/2001 |
|---|---|---|
| EP | 1 385 222 A2 | 1/2004 |
| WO | WO 97/41061 | 11/1997 |

OTHER PUBLICATIONS

Matthew H. Luly, Electrical resistivity of fluorinated carbon black, Allied-Signal Inc., Buffalo Research Laboratory, Buffalo, New York, Sep./Oct. 1988, vol. 3, No. 5, pp. 890 to 897.

* cited by examiner

*Primary Examiner* — Patrick Ryan
*Assistant Examiner* — Muhammad Siddiquee
(74) *Attorney, Agent, or Firm* — Michael F. Scalise

(57) ABSTRACT

The current invention describes a lithium/carbon monofluoride (Li/CF$_x$) cell capable of delivering sufficient power to supply an ICD or similar demanding device. The cell exhibits the typical excellent long-term stability and predictability of the CF$_x$ system, as well as its high energy density (greater than about 300 Ah/cc, greater than about 600 Wh/cc). Additionally, the cell is capable of delivering about 0.5 W/cc of cathode volume for greater than 5 seconds with a voltage above 1.70 V (FIG. 1). The following invention embodiments can be applied individually or in conjunction with each other.

27 Claims, 5 Drawing Sheets

LITHIUM/FLUORINATED CARBON CELL FOR HIGH-RATE PULSATLIE APPLICATIONS

CROSS-REFERENCE TO RELATED APPLICATION

This application claims priority from U.S. Provisional Application Ser. No. 60/764,152, filed Feb. 1, 2006.

BACKGROUND OF THE INVENTION

1. Field of the Invention

The present invention generally relates to the conversion of chemical energy to electrical energy. More particularly, the present invention relates to the use of a lithium/fluorinated carbon, for example, a $Li/CF_x$ cell, as a power source for an implantable medical device. Such applications require the cell to discharge under a light load for extended periods of time interrupted from time-to-time by pulse discharge. Specifically, the cell is ideal for use in an implantable cardioverter defibrillator.

2. Prior Art

Currently, implantable cardioverter defibrillators (ICD's) are powered by lithium/silver vanadium oxide (Li/SVO) cells. This chemistry provides excellent high-rate pulsing capability. Despite their high power, however, Li/SVO cells demonstrate time-dependent resistance growth during middle-of-life under some usage conditions. This resistance growth can reduce the ability of the cell to deliver energy as quickly as desired. Ideally, ICD's require a cell chemistry whose performance is easily predictable and not time-dependent.

An exemplary chemistry that meets these requirements is of a lithium/carbon monofluoride couple ($Li/CF_x$). This system is currently used to power implantable medical devices with intermediate power requirements. Despite its excellent stability, however, the $Li/CF_x$ system has not been used for demanding applications such as ICD's because it is not believed to have sufficient power capability. Existing $Li/CF_x$ cell technology has a maximum power capability of 0.05 W/cc. The limited power capability is a direct result of low electrolyte conductivity ($<1\times10^{-2}$ S/cm at 37° C.), high electrical resistivity of the cathode matrix (>50 ohm*cm), and a low anode-to-cathode interface area of 5 $cm^2$ to 20 $cm^2$.

SUMMARY OF THE INVENTION

In that respect, the present $Li/CF_x$ cell addresses each one of these areas. The result is a $Li/CF_x$ cell that is ideally suited for demanding high current pulsatile applications, such as those needed to power an implantable cardioverter defibrillator, and the like.

These and other aspects and advantages of the present invention will become increasingly more apparent to those skilled in the art by reference to the following description read in conjunction with the appended drawings.

DETAILED DESCRIPTION OF THE PREFERRED EMBODIMENTS

Figure 1:
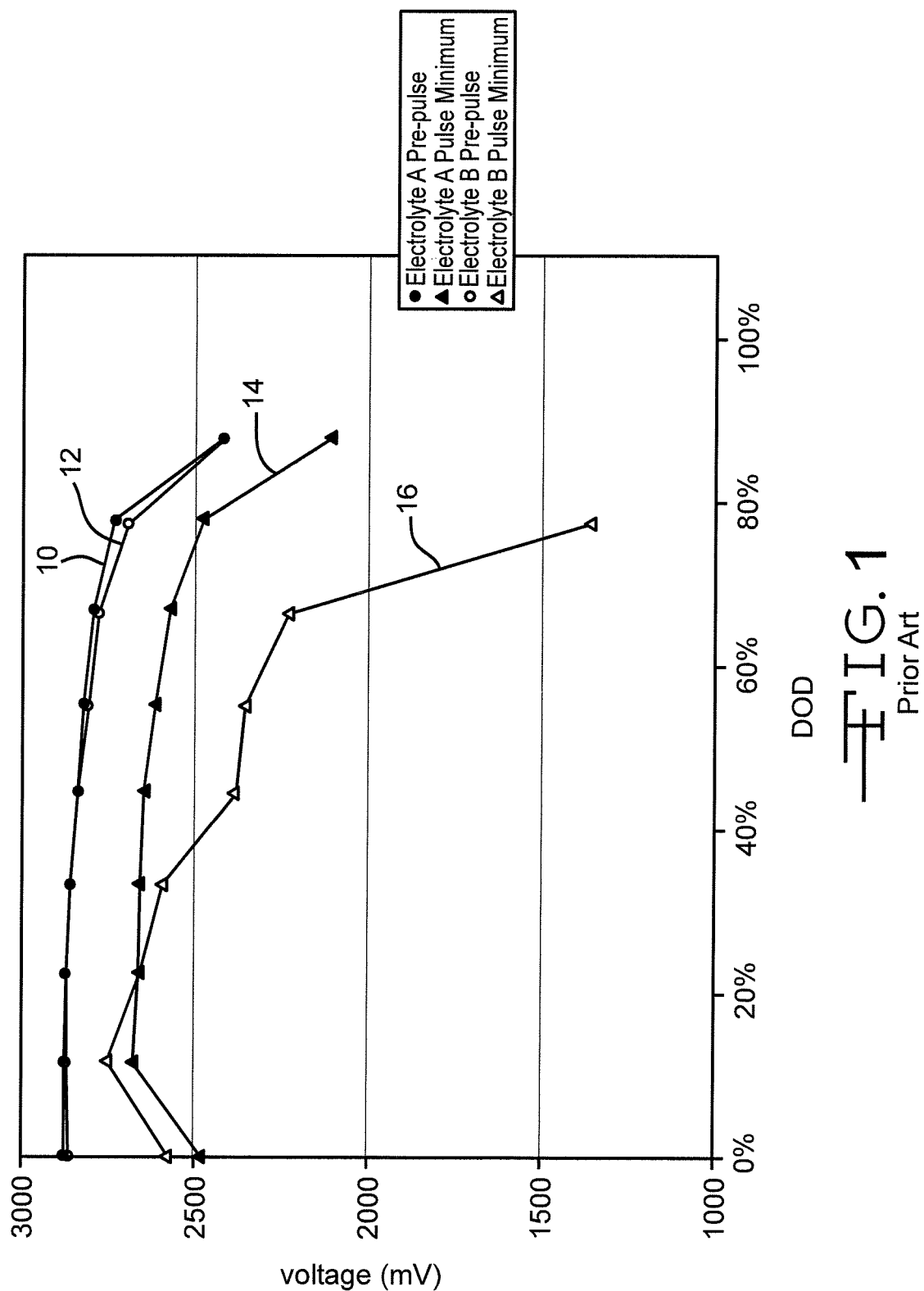
FIG. 1 is a graph of two prior art $Li/CF_x$ cells comprising non-fibrous cathode active material, one being activated with a high conductivity electrolyte and the other with a low conductivity electrolyte, and then subjected to a pulse discharge regime.

The term depth-of-discharge (DoD) is defined as the ratio of delivered capacity to theoretical capacity times 100.

The term "pulse" means a short burst of electrical current of significantly greater amplitude than that of a pre-pulse current immediately prior to the pulse. A pulse train consists of at least one pulse of electrical current. If the pulse train consists of more than one pulse, they are delivered in relatively short succession with or without open circuit rest between the pulses. An exemplary pulse train may consist of four 10-second pulses (23.2 $mA/cm^2$) with about a 10 to 30 second rest, preferably about 15 second rest, between each pulse. A typically used range of current densities for cells powering implantable medical devices is from about 15 $mA/cm^2$ to about 50 $mA/cm^2$, and more preferably from about 18 $mA/cm^2$ to about 35 $mA/cm^2$. Typically, a 10-second pulse is suitable for medical implantable applications. However, it could be significantly shorter or longer depending on the specific cell design and chemistry. Current densities are based on square centimeters of the cathode electrode.

An electrochemical cell that possesses sufficient energy density and discharge capacity required of implantable medical devices comprises an anode of active materials selected from Groups IA, IIA and IIIA of the Periodic Table of the Elements. Lithium is preferred and its alloys and intermetallic compounds include, for example, Li—Si, Li—Al, Li—Mg, Li—Al—Mg, Li—B and Li—Si—B. The form of the anode may vary, but typically it comprises a thin sheet or foil of lithium metal or an alloy thereof, contacted to an anode current collector. The current collector includes an extended tab or lead for connection to the negative terminal.

The cathode comprises fluorinated carbons that are prepared from fluorine and carbon including graphitic and non-graphitic forms of carbon, such as coke, charcoal or activated carbon. The fluorinated carbon is represented by the formula $(CF_x)_n$, wherein x varies between about 0.1 to 1.9 and preferably between about 0.5 and 1.2, and $(C_2F)_n$, wherein the n refers to the number of monomer units which can vary widely. In that respect, throughout this specification the term "$CF_x$" is meant as a general reference to fluorinated carbons including those of the formula $(C_2F)_n$.

A preferred fluorinated carbon material is described in U.S. Patent Application Pub. No. 2004/0013933—Fluorinated Carbon For Metal/Fluorinated Carbon Batteries, the disclosure of which is incorporated herein by reference. The preferred properties of the $CF_x$ material are shown in Table 1. Carbon materials with these properties are desirable for all implantable battery applications using high conductivity electrolytes. This includes hybrid cathodes having the sandwich cathode configuration: $SVO/CF_x/SVO$, as described in U.S. Pat. No. 6,551,747 to Gan.

TABLE 1

| Property | Typical Range |
| --- | --- |
| BET Surface Area (m²/g) | 200-400 |
| % F | 61%-65% |
| Capacity to 2.0 V (mAh/g) | 800-1000 |
| Aspect Ratio | 2-25 |
| D50 (μm) | 2-10 |

The $CF_x$ active material is preferably mixed with a conductive diluent and a binder material to provide a cathode mixture having an electronic resistivity of less than about 50 ohm*cm when measured without the current collector. The conductive material is added separately and mixed therewith or it is coated or deposited onto the $CF_x$ material. Examples of suitable conductive materials include any carbon containing a $sp^2$-hybridized carbon, such as carbon black, expanded graphite, carbon fibers, single-walled carbon nanotubes, multi-walled carbon nanotubes, and the like. The conductive carbon material can be partially fluorinated to provide additional electrochemical capacity while retaining some $sp^2$-hybridized bonds and some conductive character.

In another embodiment, the conductive material is a conductive metal that is not oxidized at potentials above 3.0 V versus lithium. Examples include, but are not limited to, silver, gold, aluminum, or titanium. The metal is preferably in a powder form.

Regardless its form, the quantity of conductive material should be as small as possible to maximize the amount of active $CF_x$ material in the cell. In that respect, the conductive material is present in quantities as high as about 20% by weight, but more preferably is at about 5%, or less. A lower resistivity or higher conductivity means that the cathode is capable of providing higher power at beginning-of-life before the $CF_x$ becomes conductive as a result of discharge.

Examples of appropriate binders include PVDF, PTFE, polyethylene (UHMW), styrene-butadiene rubber, cellulose, polyacrylate rubber, and copolymers of acrylic acid or acrylate esters with polyhydrocarbons such as polyethylene or polypropylene. The binder is preferably present at from about 1 to 5 weight percent of the cathode mixture.

In another embodiment, a conductive polymer containing a conjugated π-system, such as polypyrrole, polythiophene, or polyaniline, is used as both a binder and a conductive additive. In all cases, the conductive polymer is mixed with the $CF_x$ active material or applied thereto in order to provide the minimum possible cathode resistivity.

The cathode is preferably prepared by contacting a dry mixture of from about 90 to about 98 weight percent of the fluorinated carbon active material, up to about 5 weight percent of a conductive diluent and about 1 to 5 weight percent of a polymeric binder onto a current collector. The current collector is made of titanium, aluminum, stainless steel or carbon and is in the form of a foil, chemically-etched screen, expanded metal, punched screen, or perforated foil. The current collector is preferably coated with carbon, noble metals or a carbide-type coating. This provides a stable resistance at the electrochemical interface of the current collector with the $CF_x$. The dry $CF_x$ mixture can also be extruded or coated onto a non-binding substrate to form a free-standing sheet that is subsequently punched to size and applied to the current collector by pressing. Alternatively, the cathode mixture in the form of a slurry or paste is applied to a foil or perforated foil, and then the cathode is dried. Regardless the preparation method, the cathode is compressed or calendered to the minimum thickness without detrimentally affecting the cell's power capability. This corresponds to an apparent cathode matrix density of about 1.2 g/cc to about 2.0 g/cc. The amount of cathode material is from about 10 mg/cm² to about 200 mg/cm².

The cell is prepared in either a jelly-roll or parallel multi-plate configuration. The cathode is overlaid with the anode with one or two layers of separator interspersed between them. The anode capacity is from about equal to that of the cathode capacity to about 30% greater than that thereof. The total contact area between the anode and cathode is from about 50 cm² to 500 cm².

Examples of separator materials include polyethylene or polypropylene, single and multi-layer, woven and non-woven with a thickness of from about 10 microns to about 30 microns. The separator must exhibit a high ionic conductivity and preferably has a melting or shutdown characteristics below the melting point of lithium, which is at about 180° C. The separator is wound between the anode and the cathode or heat-sealed around one or both of them. The total anode surface area and cathode surface area are similar to each other, although either the anode or the cathode can be slightly larger than the other.

The cell stack is then inserted into a stainless steel, steel-plated nickel, or titanium open ended container and one of the anode and the cathode current collectors is welded thereto. In the case of a case-negative design, the anode is welded to the container, but a case-positive design is also possible. The container can be cylindrical in shape or of a prismatic shape containing at least two parallel walls. A lid with a hermetically-insulated terminal pin is then laser-welded onto the open end of the container to form a casing. Alternatively, the casing is assembled from two shallow-drawn pieces, one with a hermetically insulated feedthrough, in a "clam-shell" type configuration. In any event, electrolyte is added via a fill hole. The electrolyte weight is from about 30% to about 130% of the $CF_x$ weight. The cell is then welded shut.

The electrolyte conductivity should be greater than about $1\times10^{-2}$ S/cm at 37° C. Examples of appropriate electrolyte solvents include lactones, esters, carbonates, sulfones, sulfites, nitrites and ethers. Some specific examples are γ-butyrolactone, ethylene carbonate, propylene carbonate, dimethyl carbonate, diethyl carbonate, ethyl methyl carbonate, vinylene carbonate, tetrahydrofuran, dioxolane, dioxane, dimethoxyethane, and mixtures thereof. The electrolyte solvent system can be a single solvent or a mixture of one or more of the above solvents. Examples of appropriate salts include $LiBF_4$, $LiPF_6$, $LiAsF_6$, $LiN(SO_2CF_3)_2$, $LiN(SO_2C_2F_5)_2$, $LiB(C_2O_4)_2$, and mixtures thereof. The salt concentration should be between about 0.5 M and about 1.5 M. A single salt or a combination of salts can be used. A preferred electrolyte combination is 1M $LiAsF_6$ in PC:DME (1/1) or EC:DME (1/1), by volume.

ICD's specifically require very high pulse currents of greater than about 10 mA/cm² of cathode surface area. In order to meet the requirements of these demanding applications, it is critical that the anode passivation film be stable over time. This means that the composition of the anode passivation film must provide electronic insulation while providing minimal resistance to ion flow between the anode and the electrolyte. Failure to meet these requirements results in unacceptably high internal cell resistance for ICD and other high-rate applications. Therefore, the formation of a stable passivation film requires the correct choice of electrolyte and $CF_x$ material. Since conventional practice does not require high current pulses from a Li/$CF_x$ system, such cells have typically been activated with relatively low conductivity electrolytes.

This is illustrated in FIG. 1 where two comparative Li/CF$_x$ cells constructed in a case-negative prismatic configuration using hermetically sealed titanium housings and glass-to-metal seals. The cathode was fabricated from a mixture of CF$_x$, conductive carbon, and polytetrafluoroethylene binder pressed onto a carbon coated titanium current collector screen. The cathode was centrally located and physically isolated from a lithium metal anode located on each side thereof by a polymer based separator material. The cells were cathode limited and approximately 7.833 cc in size.

In particular, the curve having the numerical designation 10 was constructed from the background load of a Li/CF$_x$ cell comprising a prior art non-fibrous fluorinated carbon made from a petroleum coke material activated with 1M LiBF$_4$ in GBL while the curve labeled 12 was from a similarly constructed Li/CF$_x$ cell activated with an electrolyte of 1M LiAsF$_6$ in a 50/50 mixture, by volume, of PC/DME. The curves labeled 14 and 16 were constructed from the respective cells discharged by attaching a resistor selected to provide a 12 month discharge time to 100% DoD. The cells were then pulsed once per month at 2 mA/cm$^2$ of cathode surface area for 10 seconds.

While both prior art Li/CF$_x$ cells have acceptable anode passivation properties and are capable of being pulse discharged because their internal resistance is roughly constant throughout life, they are not suitable for high rate applications, such as required in an ICD, and the like. It should be noted that the cell used to construct curve 16 reached its end of discharge prematurely. This graph shows that merely activating a Li/CF$_x$ cell comprising a non-fibrous fluorinated carbon with a high pulse electrolyte system of 1M LiAsF$_6$ in a 50/50 mixture, by volume, of PC/DME, which is preferred for high pulse Li/SVO cells, does not result in a high pulsatile Li/CF$_x$ cell. Not only must the electrolyte be capable of supporting high current pulses, but the fluorinated carbon must be tailored accordingly as well.

Conversely, the use of an electrolyte having conductivity greater than about 1×10$^{-2}$ S/cm reduces the cell's internal resistance at beginning-of-life and provides a higher loaded voltage and power. During discharge, however, the anode passivation film becomes thicker, resulting in increasing resistance with discharge. The power capability of such a Li/CF$_x$ cell becomes unacceptably high toward end-of-life. Such performance is particularly the case with CF$_x$ materials derived from petroleum coke or graphite.

Therefore, an important aspect of the present invention is that an electrolyte having a relatively high conductivity greater than about 1×10$^{-2}$ S/cm at 37° C. is used in conjunction with a CF$_x$ material derived from a carbon fiber. The fibrous CF$_x$ material is ground to a typical aspect ratio between about 2 and about 25. The aspect ratio is defined as the length of the fiber divided by its diameter. This type of carbon material is useful with both low and high conductivity electrolytes without creating anode passivation problems.

Figure 2:
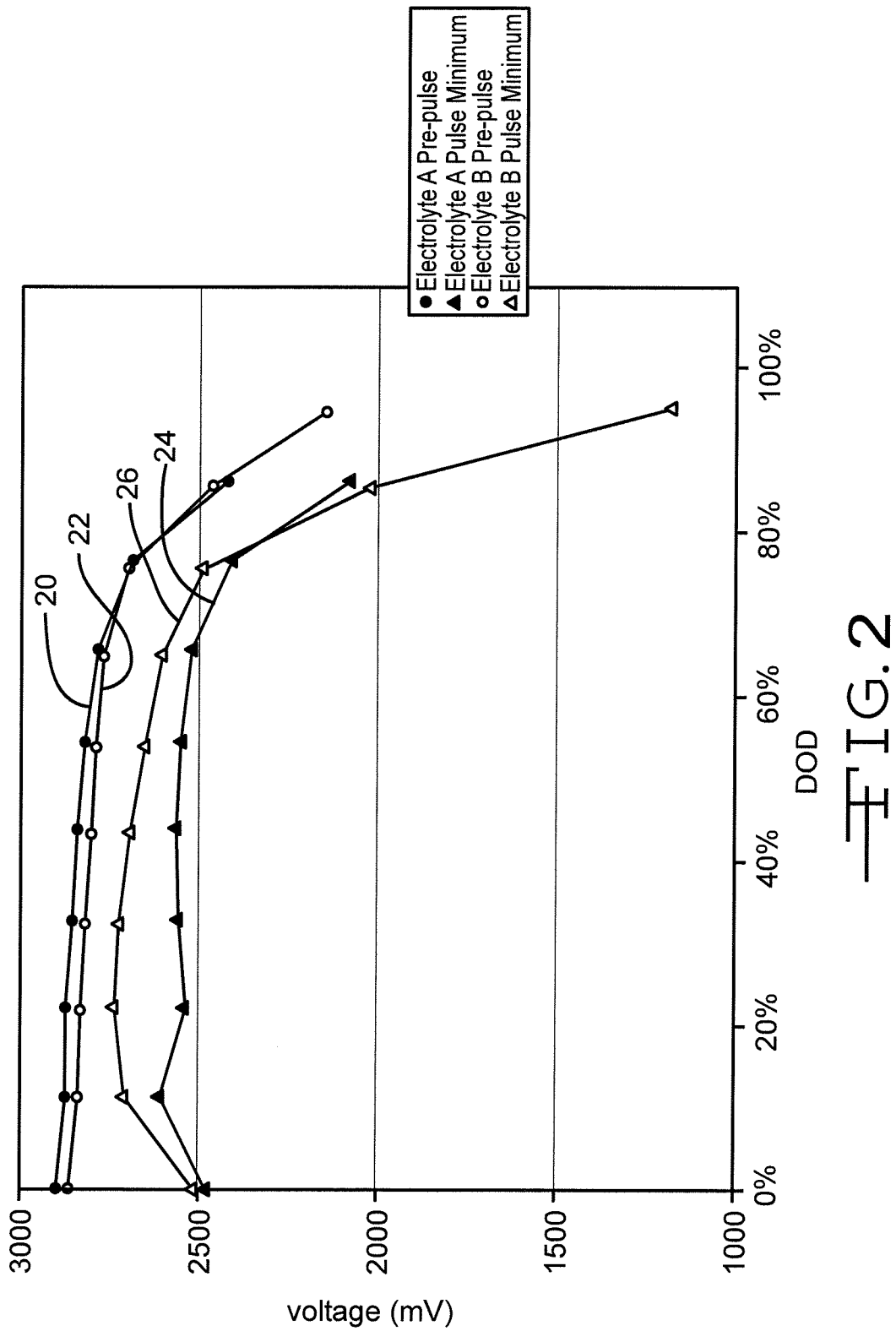
FIG. 2 is a graph of two $Li/CF_x$ cells comprising a fibrous cathode active material according to the present invention, wherein one is activated with a high conductivity electrolyte and the other with a low conductivity electrolyte and then subjected to a pulse discharge regime.

The graph illustrated in FIG. 2 was constructed from two Li/CF$_x$ cells constructed in a case-negative prismatic configuration using hermetically sealed titanium housings and glass-to-metal seals. The cathode was fabricated from a mixture of CF$_x$, conductive carbon, and polytetrafluoroethylene binder pressed onto a carbon coated titanium current collector screen. The cathode was centrally located and physically isolated from a lithium metal anode located on each side thereof by a polymer based separator material. The cells were cathode limited and approximately 7.833 cc in size.

In particular, curve 20 was constructed from the background load of present invention Li/CF$_x$ cell comprising a fibrous fluorinated carbon activated with 1M LiBF$_4$ in GBL while the curve labeled 22 was from a similarly constructed Li/CF$_x$ cell activated with an electrolyte of 1M LiAsF$_6$ in a 50/50 mixture, by volume, of PC/DME. The curves labeled 24 and 26 were constructed from the respective cells discharged by attaching a resistor selected to provide a 12 month discharge time to 100% DoD. The cells were then pulsed once per month at 2 mA/cm$^2$ of cathode surface area for 10 seconds. This graph shows that while a traditional Li/CF$_x$ cell electrolyte of 1 M LiBF$_4$ in GBL activating a fibrous fluorinated carbon cathode material exhibits acceptable background and pulse discharge characteristics, the best results are with the cell that has both the high conductivity electrolyte and the fibrous fluorinated carbon material (curves 22, 26).

Therefore, an electrochemical cell incorporating a CF$_x$ material derived from a carbon fiber of the defined aspect ratio activated with a high conductivity electrolyte (having a conductivity greater than about 1×10$^{-2}$ S/cm at 37° C.) provides high current pulses with high loaded voltage throughout discharge, even after having been discharged over many years at 37° C. Such a cell is unknown in conventional practice and, therefore, suitable for ICD applications.

As defined by equation 1, the combination of a conductive electrolyte and a conductive cathode matrix results in an internal cell DC resistance of less than about 70 ohms×cm$^2$ of cathode surface area at beginning-of-life. Preferably, the internal DC resistance is less than about 50 ohms×cm$^2$.

$$R_{DC}(\text{ohms} \times \text{cm}^2) = \frac{PrePulseVoltage(V) - PulseMinimumVoltage(V)}{PulseCurrentDensity(A/cm^2 \, of ElectrodeInterfaceArea)} \quad \text{Equation 1}$$

—where pulse length=10 seconds

The cell exhibits the typical excellent long-term stability and predictability of the CF$_x$ system, as well as its high energy density (greater than about 300 Ah/cc, greater than about 600 Wh/cc). Additionally, the cell is capable of delivering about 0.5 W/cc of cathode volume for greater than 5 seconds with a voltage above 1.70 V.

Figure 3:
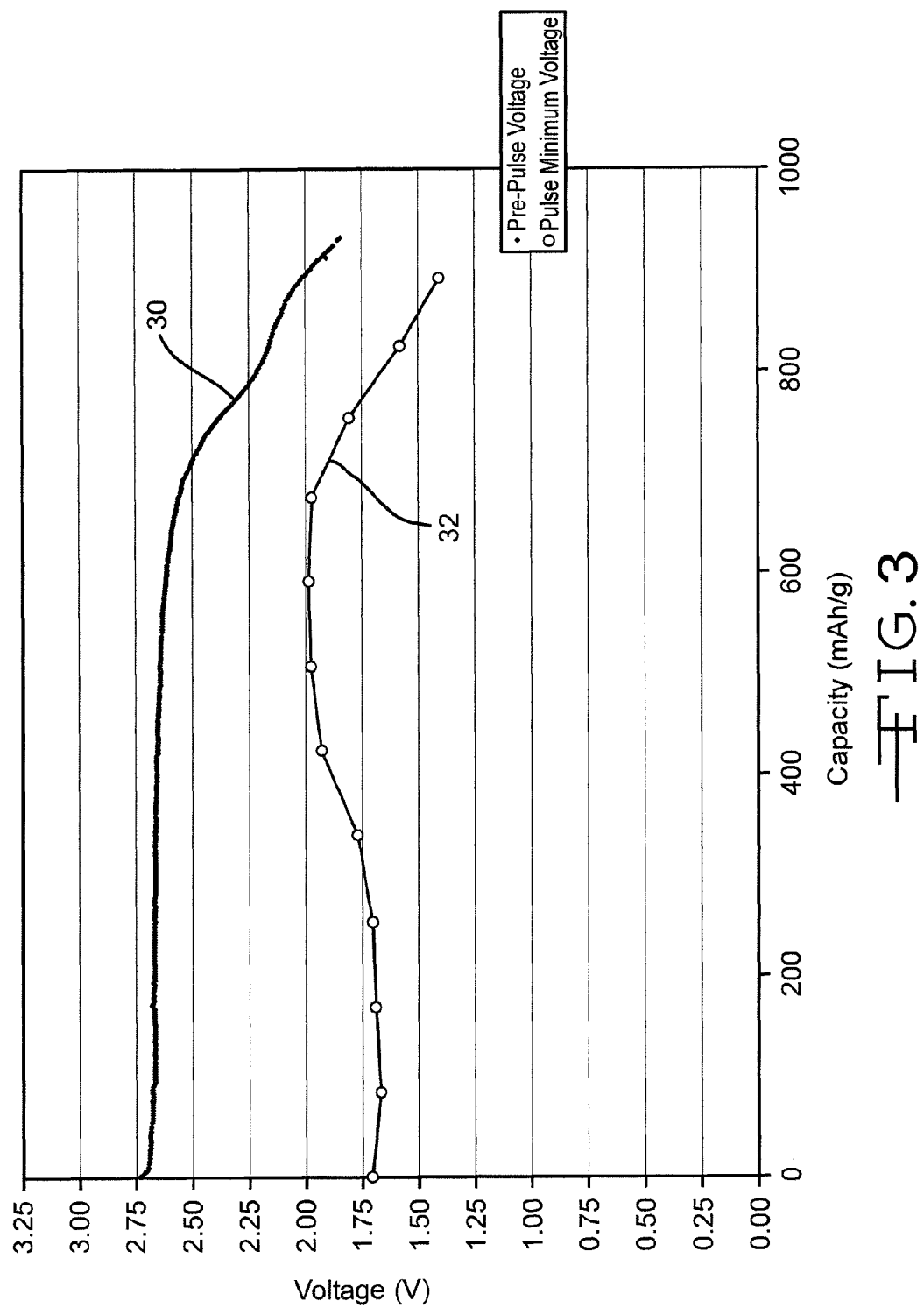
FIG. 3 is a graph illustrating the relatively high energy density of a $Li/CF_x$ cell constructed according to the present invention and subjected to a pulse discharge regime.

This is illustrated in FIG. 3, which was constructed from a Li/CF$_x$ cell comprising a cathode of a mixture of CF$_x$, conductive additive and binder that was pelletized by pressing 250 mg in a fixture using a pressure of 25 tons/in.$^2$. A cathode disc was punched from the resulting pellet using a cork borer. The CF$_x$ disc was placed on a stainless steel coin cell bottom. Then, 200 µL of 1M LiAsF$_6$ in 1:1 PC:DME was applied directly to the CF$_x$ disc to provide adequate wetting. A 0.83 in. diameter Tonen E25 separator disc was applied to the top of the CF$_x$ disc. A lithium disc was prepared from 0.015" thick lithium ribbon by punching with a cork borer. The lithium was applied to a 0.028" thick stainless steel spacer that was then placed on top of the separator. A spring was placed on the spacer and the lid was crimped onto the cell. The cell was allowed to age for twenty-four hours prior to testing to allow the electrolyte to pervade the cathode pellet. The cell was discharged by attaching a resistor selected to provide a three week discharge time to 100% DoD. The cell was then pulsed once every 48 hours at 20 mA/cm$^2$ of cathode surface area for 10 seconds. Curve 30 was constructed from the pre-pulse voltage while curve 32 was derived from the pulse minimum voltage.

Another aspect of the present Li/CF$_x$ cell is that it is capable of delivering greater than about 10% of its useful capacity between about 2.7 volts and 2.3 volts when discharged over a period of six months, or more. Implantable medical devices typically use background voltage as a means of indicating when the cell needs to be replaced. A typical indicating voltage is at 2.7 volts measured at the device background discharge load, which is typically observed after about 5 to 10 years of discharge under load. Upon reaching the replacement indicating voltage, there must be sufficient time and discharge capacity before the cell is no longer capable of providing enough power for the medical device to function properly, which typically occurs at about 2.3 volts.

Figure 4:
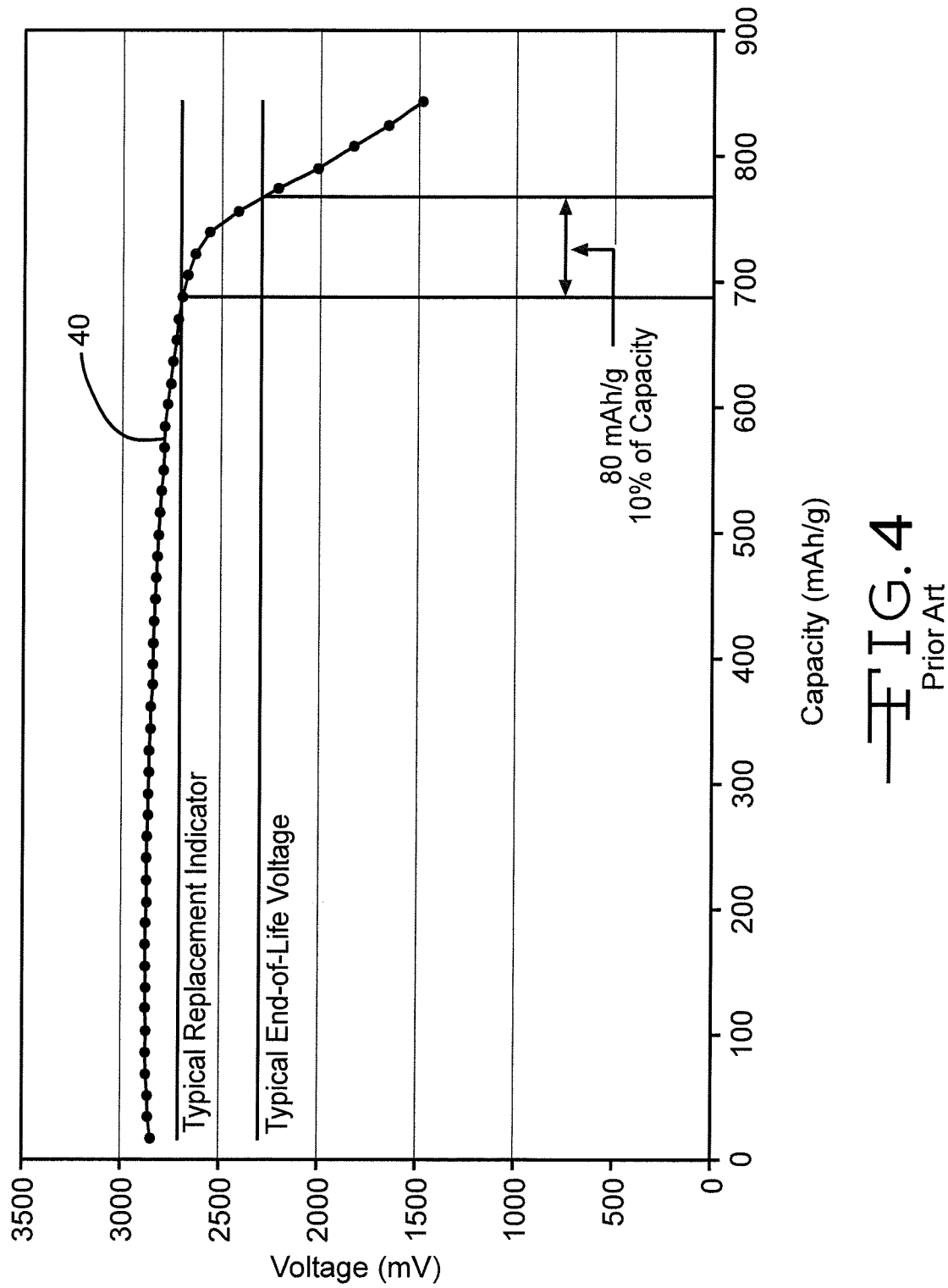
FIG. 4 is a graph of the background voltage of a prior art $Li/CF_x$ cell illustrating a typical background discharge curve that is not suitable as an elective replacement indicator.

As shown in FIG. 4, the discharge curve designated 40 of a conventionally constructed Li/CF$_x$ cell is relatively flat with a rather steep drop-off at end-of-life. The capacity of the CF$_x$ material from about 2.7 volts to end-of-life at about 2.3 volts is about 80 mAh per gram of CF$_x$. This represents about 10% of useful capacity of the CF$_x$ material, which is not always sufficient to replace the implantable medical device. Furthermore, this safety margin is not easily expanded. Raising the replacement indicating voltage above about 2.7 volts places it on a relatively flat portion of the discharge curve where it is undesirable. This is because relatively small variations in cell performance have a large impact on the depth-of-discharge at which the replacement indicator is triggered. Premature replacement indication consequently reduces the lifetime of the device, resulting in unnecessary cost and the trauma of replacement.

Figure 5:
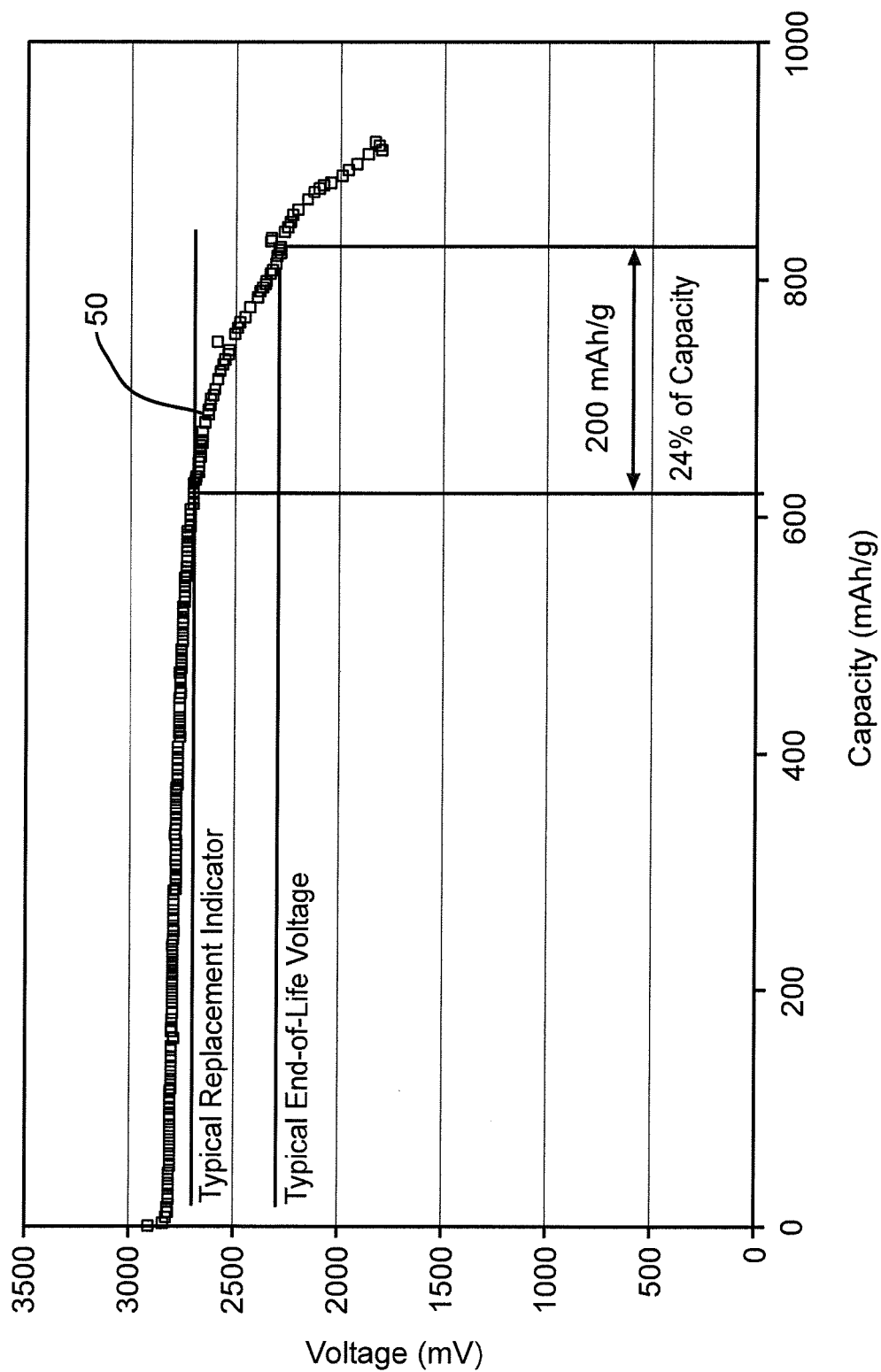
FIG. 5 is a graph of the background voltage of a present invention $Li/CF_x$ cell illustrating a background discharge curve that is suitable as an elective replacement indicator.

Preferably, the power source for an implantable medical device has a more rounded discharge profile at end-of-life. This allows for more flexible and accurate placement of the replacement indicator voltage. Thus, another attribute of the present invention is that the CF$_x$ material and electrolyte combination provide a more gradual voltage drop at end-of-life. This is illustrated in the graph in FIG. 5, where the discharge curve 50 constructed from the Li/CF$_x$ cell maintains about 24% of its useful capacity from about 2.7 volts to about 2.3 volts. Such a rounded end-of-life discharge curve makes it possible to select the replacement indicating voltage on a portion of the discharge curve where there is still a sufficient amount of remaining capacity to power the device to the end of life voltage, and before the device fails to function.

The rate of an electrochemical reaction in an electrochemical cell is partially determined by the contact area between the anode and cathode. This is termed the electrode interfacial surface area. Increasing the contact area reduces the rate of the electrochemical reaction occurring at the interface between the opposite polarity electrodes, thus reducing the over-potential associated with the discharge reaction. It is known that Li/CF$_x$ cells for ICD applications need an electrode interfacial surface area in excess of about 50 cm$^2$, but less than about 500 cm$^2$. Cells within this range have adequate pulse capability and are still manufacturable in sufficiently small sizes required for implantable medical applications. In that respect, the ratio of the electrode interfacial surface area to the external cell volume for the present Li/CF$_x$ cell is greater than about 15 square centimeters per cubic centimeter of casing volume (cm$^2$/cm$^3$), but less than about 50 cm$^2$/cm$^3$. A preferred casing size is from about 1 cm$^3$ to about 10 cm$^3$.

Another aspect of the present Li/CF$_x$ cell is that from about 1% to about 20% of the cell's theoretical capacity is removed prior to use. Because of the inherent resistivity of CF$_x$ prior to discharge, Li/CF$_x$ cells exhibit relatively high internal resistance at beginning-of-life. During discharge, the CF$_x$ material is converted to carbon, resulting in a significant enhancement in conductivity of the cathode matrix and a reduction in cell internal resistance. According to conventional practice, Li/CF$_x$ cells are discharged to about 1% DoD during manufacturing burn-in in order to reduce internal resistance to a level acceptable for relatively light load pacing functions, and the like, for example, the heart sensing and pacing functions that require electrical current of about 1 microampere to about 100 milliamperes. In order to maximize the pulse capability (electrical current of about 1 ampere to about 5 amperes) at beginning-of-life for high current applications, for example, during charging of a capacitor in a defibrillator for the purpose of delivering an electrical shock therapy to the heart to treat tachyarrhythmia, the irregular, rapid heartbeats that can be fatal if left uncorrected, it is necessary to discharge the Li/CF$_x$ to about 20% DoD. While removal of this much of the cell's theoretical capacity provides maximum power capability for a high rate implantable application, it represents a significant loss of energy density. In that respect, the power requirements and the energy density requirements of a particular application need to be balanced by selecting the appropriate pre-discharge capacity in the about 1% to about 20% DoD burn-in range. By making the CF$_x$ cathode matrix as conductive as possible, the burn-in capacity that is removed can be minimized. Preferably, the cell is discharged until the internal DC resistance as defined above is less than 40 ohms× cm$^2$. This is done by subjecting the completed cell is subjected to a discharge burn-in of from about 1% and 20% of its depth-of-discharge by applying a load to the cell for a fixed period of time. Typically, the load is chosen such that the necessary capacity can be removed in about 12 to about 24 hours. The thusly conditioned Li/CF$_x$ is now ready for use as a power source for an implantable medical device, particularly one requiring current pulse discharge applications.

It is appreciated that various modifications to the inventive concepts described herein may be apparent to those skilled in the art without departing from the spirit and the scope of the present invention defined by the hereinafter appended claims.

What is claimed is:

1. An electrochemical cell, which comprises:
  a) an anode comprising lithium;
  b) a cathode comprising:
    i) 90 to 98 weight percent fluorinated carbon fibers having a general formula of $C_2F$ or $CF_x$ with x ranging from 0.5 to 1.2 and an aspect ratio of from 2 to 25 as a cathode active material;
    ii) up to 5 weight percent of a conductive additive other than the fluorinated carbon fibers to thereby form a cathode active mixture; and
    iii) a current collector selected from the group consisting of titanium, aluminum, stainless and carbon supporting the fluorinated carbon/conductive additive cathode active mixture,
    iv) wherein when the current collector is one of titanium, aluminum and stainless steel, it is provided with a coating selected from the group consisting of carbon, noble metals and a carbide-type material so that the fluorinated carbon does not physically touch the current collector, but is in electrical continuity therewith; and
  c) a separator preventing direct physical contact between the anode and the cathode; and
  d) an electrolyte having a conductivity of at least $1\times10^{-2}$ S/cm at 37° C. activating the anode and the cathode.

2. The electrochemical cell of claim 1 wherein the fluorinated carbon fibers have a fluorine content of 61% to 65%.

3. The electrochemical cell of claim 1 wherein the fluorinated carbon fibers have a capacity to 2.0 volts of 800 mAh/g to 1,000 mAh/g.

4. The electrochemical cell of claim 1 wherein the electrolyte includes at least one salt selected from the group consisting of $LiBF_4$, $LiPF_6$, $LiAsF_6$, $LiN(SO_2CF_3)_2$, $LiN(SO_2C_2F_5)_2$ and $LiB(C_2O_4)_2$.

5. The electrochemical cell of claim 1 wherein the solvent is selected from the group consisting of γ-butyrolactone, ethylene carbonate, propylene carbonate, dimethyl carbonate, diethyl carbonate, ethyl methyl carbonate, vinylene carbonate, tetrahydrofuran, dioxolane, dioxane, dimethoxyethane, and mixtures thereof.

6. The electrochemical cell of claim 1 wherein the cathode further comprises about 1 to 5 weight percent of a polymeric binder.

7. The electrochemical cell of claim 1 wherein the conductive additive is selected from the group consisting of carbon black, expanded graphite, carbon fibers, single-walled carbon nanotubes, multi-walled carbon nanotubes carbon, titanium powder, aluminum powder, silver powder, gold powder, polypyrrole, polythiophene, polyaniline, and mixtures thereof.

8. The electrochemical cell of claim 6 wherein the binder is selected from the group consisting of PVDF, PTFE, polyethylene (UHMW), styrene-butadiene rubber, cellulose, polyacrylate rubber, copolymers of acrylic acid or acrylate esters with polyethylene or polypropylene, polypyrrole, polythiophene, polyaniline, and mixtures thereof.

9. An electrochemical cell, comprising: a) a lithium anode active material in electrical contact with a nickel current collector; b) a cathode comprising 90 to 98 weight percent fluorinated carbon fibers as a cathode active material having a general formula of $C_2F$ or $CF_x$ with x ranging from 0.5 to 1.2; c) up to 5 weight percent of a conductive additive other than the fluorinated carbon fibers to thereby form a cathode active mixture supported on a titanium current collector, the fluorinated carbon fibers having: i) an aspect ratio of from 2 to 25; ii) a BET surface area of from 200 $m^2$/gram to 400 $m^2$/gram; and iii) a D50 (μm) of 2 to 10, wherein the titanium current collector is provided with a coating selected from the group consisting of carbon, noble metals and a carbide-type material so that the fluorinated carbon fibers do not physically touch the current collector, but are in electrical continuity there with; and c) a separator preventing direct physical contact between the anode and the cathode; and d) an electrolyte comprising 1.0 M $LiAsF_6$ in a 50/50 mixture, by volume of propylene carbonate and dimethoxyethane.

10. A method for providing an electrochemical cell, comprising the steps of: a) providing an anode comprising lithium; b) providing a cathode comprising: i) 90 to 98 weight percent fluorinated carbon fibers having a general formula of $C_2F$ or $CF_x$ with x ranging from 0.5 to 1.2 and an aspect ratio of from 2 to 25 as a cathode active material; ii) up to 5 weight percent of a conductive additive other than the fluorinated carbon fibers to thereby form a cathode active mixture; and iii) a current collector selected from the group consisting of titanium, aluminum, stainless and carbon supporting the fluorinated carbon fibers/conductive additive cathode active mixture, iv) wherein when the current collector is one of titanium, aluminum and stainless steel, the current collector is provided with a coating selected from the group consisting of carbons noble metals and a carbide-type material so that the fluorinated carbon fibers do not physically touch the current collector, but are in electrical continuity there with; c) disposing a separator between the anode and cathode to prevent direct physical contact between them; and d) activating the anode and the cathode with an electrolyte having a conductivity of at least $1 \times 10^{-2}$ S/cm at 37° C.; and e) wherein the anode-to-cathode interface area is greater than 50 $cm^2$, but less than 500 $cm^2$.

11. The method of claim 10 including providing the fluorinated carbon fibers having a fluorine content of 61% to 65%.

12. The method of claim 10 including providing the fluorinated carbon fibers having a capacity to 2.0 volts of 800 mAh/g to 1,000 mAh/g.

13. The method of claim 10 including providing the electrolyte having at least one salt selected from the group consisting of $LiBF_4$, $LiPF_6$, $LiAsF_6$, $LiN(SO_2CF_3)_2$, $LiN(SO_2C_2F_5)_2$ and $LiB(C_2O_4)_2$.

14. The method of claim 10 including providing the electrolyte comprising a solvent selected from the group consisting of γ-butyrolactone, ethylene carbonate, propylene carbonate, dimethyl carbonate, diethyl carbonate, ethyl methyl carbonate, vinylene carbonate, tetrahydrofuran, dioxolane, dioxane, dimethoxy thane, and mixtures thereof.

15. The method of claim 10 including providing the cathode comprising about 1 to 5 weight percent of a polymeric binder.

16. The method of claim 10 including selecting the conductive additive from the group consisting of carbon black, expanded graphite, carbon fibers, single-walled carbon nanotubes, multi-walled carbon nanotubes carbon, titanium powder, aluminum powder, silver powder, gold powder, polypyrrole, polythiophene, polyaniline, and mixtures thereof.

17. The method of claim 15 including selecting the binder from the group consisting of PVDF, PTFE, polyethylene (UHMW), styrene-butadiene rubber, cellulose, polyacrylate rubber, copolymers of acrylic acid or acrylate esters with polyethylene or polypropylene, polypyr ole, polythiophene, polyaniline, and mixtures thereof.

18. The electrochemical cell of claim 1 wherein the anode-to-cathode interface area is greater than about 50 $cm^2$, but less than about 500 $cm^2$.

19. The electrochemical cell of claim 9 wherein the anode-to-cathode interface area is greater than about 50 $cm^2$, but less than about 500 $cm^2$.

20. The method of claim 10 including providing the electrochemical cell having an anode-to-cathode interface area greater than about 50 $cm^2$, but less than about 500 $cm^2$.

21. The electrochemical cell of claim 1 wherein the fluorinated carbon fibers have a BET surface area of from 200 $m^2$ gram to 400 $m^2$ gram.

22. The electrochemical cell of claim 1 wherein the fluorinated carbon fibers have a D50 (μm) of 2 to 10.

23. The method of claim 10 including providing the fluorinated carbon fibers having a BET surface area of from 200 $m^2$/gram to 400 $m^2$/gram.

24. The method of claim 10 including providing the fluorinated carbon fibers having a D50 (μm) of 2 to 10.

25. An electrochemical cell, which comprises: a) an anode comprising lithium; b) a cathode comprising: i) 90 to 98 weight percent fluorinated carbon fibers having a general, formula of $C_2F$ or $CF_x$ with x ranging from 0.5 to 1.2 and an aspect ratio of from 2 to 25 as a cathode active material; ii) a conductive additive other than the fluorinated carbon fibers to thereby form a cathode active mixture; and iii) a current collector supporting the cathode active mixture; and c) a separator preventing direct physical contact between the anode and the cathode; arid d) an electrolyte activating the anode and the cathode.

26. The electrochemical cell of claim 25 wherein the conductive additive is present at up to about 5 weight percent of the cathode active mixture.

27. The electrochemical cell of claim 25 wherein the electrolyte has a conductivity of at least about $1 \times 10^{-2}$ S/cm at 37° C.

\* \* \* \* \*

UNITED STATES PATENT AND TRADEMARK OFFICE
CERTIFICATE OF CORRECTION

| | | |
|---|---|---|
| PATENT NO. | : 8,685,568 B2 | Page 1 of 1 |
| APPLICATION NO. | : 11/668500 | |
| DATED | : April 1, 2014 | |
| INVENTOR(S) | : Krehl et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,156 days.

Signed and Sealed this
Fourth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,685,568 B2  
APPLICATION NO. : 11/668500  
DATED : April 1, 2014  
INVENTOR(S) : Paul Krehl et al.

Page 1 of 1

It is certified that error appears in the above-identified patent and that said Letters Patent is hereby corrected as shown below:

On the title page item (54), Title, line 2 and in the Specification, Col. 1, line 2, delete "PULSATLIE" and insert --PULSATILE--

In the Claims

Column 9, line 62 (Claim 10, line 15) between the words "carbons" and "noble" insert a --,--

Column 10, line 33 (Claim 17, line 5) delete "polypyr ole" and insert --polyrrole--

Column 10, line 56 (Claim 25, line 3) after the word "general" delete the ","

Signed and Sealed this  
Thirty-first Day of March, 2015

Michelle K. Lee  
*Director of the United States Patent and Trademark Office*